United States Patent [19]
Lee

[11] Patent Number: 5,811,775
[45] Date of Patent: Sep. 22, 1998

[54] OPTICAL DATA ELEMENT INCLUDING A DIFFRACTION ZONE WITH A MULTIPLICITY OF DIFFRACTION GRATINGS

[75] Inventor: Robert Arthur Lee, Victoria, Australia

[73] Assignee: Commonwealth Scientific and Industrial Research Organisation, Victoria, Australia

[21] Appl. No.: 530,117

[22] Filed: Dec. 5, 1995

[30] Foreign Application Priority Data

Apr. 6, 1993 [AU] Australia .................................. PL8178

[51] Int. Cl.⁶ ........................................................ G06K 7/10
[52] U.S. Cl. ................................................. 235/457; 235/494
[58] Field of Search ......................................... 235/457, 487, 235/494; 250/237 G, 548, 559.29, 559.3

[56] References Cited

U.S. PATENT DOCUMENTS

| | | | |
|---|---|---|---|
| 2,735,617 | 2/1956 | Knutsen | 235/487 X |
| 3,417,231 | 12/1968 | Stites et al. | 235/487 X |
| 3,814,904 | 6/1974 | Russell et al. | 235/487 X |
| 3,873,813 | 3/1975 | Lahr et al. | 235/468 X |
| 3,919,447 | 11/1975 | Kilmer, Jr. et al. | 235/491 X |
| 4,011,435 | 3/1977 | Phelps et al. | 235/487 X |
| 4,020,278 | 4/1977 | Carre et al. | 235/488 X |
| 4,143,810 | 3/1979 | Greenaway | 235/487 |
| 5,291,027 | 3/1994 | Kita et al. | 250/566 |

FOREIGN PATENT DOCUMENTS

| | | |
|---|---|---|
| 0075674 | 4/1983 | European Pat. Off. . |
| 5144078 | 6/1993 | Japan . |
| 5144079 | 6/1993 | Japan . |

*Primary Examiner*—Donald T. Hajec
*Assistant Examiner*—Michael G. Lee
*Attorney, Agent, or Firm*—Sughrue, Mion, Zinn, Macpeak & Seas, PLLC

[57] ABSTRACT

An optical data element includes a plurality of diffraction zones wherein each zone contains a multiplicity of diffraction gratings. These zones may be illuminated and the resultant one or more diffracted beams detected to provide a signature for the element consisting of a series of discrete signature signals each generated by the plurality of zones and each including portions or relatively different intensities. At least one of the diffraction zones has a segment thereof modified whereby to discernibly alter at least one of the discrete signature signals of the signature and to thereby form a data segment of the optical data element.

38 Claims, 7 Drawing Sheets

OPTICAL DATA ELEMENT INCLUDING A DIFFRACTION ZONE WITH A MULTIPLICITY OF DIFFRACTION GRATINGS

FIELD OF THE INVENTION

The invention relates to an optical data element incorporating diffraction gratings, and to associated technology. The optical data element has particular though certainly not exclusive application in place of conventional barcodes, or as a security device on data storage cards such as credit cards, security cards and prepaid cards.

BACKGROUND ART

The present applicant's international patent publication WO91/03747 (application PCT/AU90/00395) proposes a diffraction grating structure comprised of a multiplicity of pixels which are individual optical diffraction gratings so that the pixellated diffraction grating when illuminated generates an optically variable image. Pixellated diffraction gratings have become known as Pixelgrams (Trade Mark). According to preferred aspects of the arrangement disclosed in the international application, the respective diffraction grating of each grating pixel comprises a plurality of reflective or transmissive grooves or lines which are usually curved across a pixel. Groove or line curvature determines both local image intensity, e.g. shading, and local optical structural stability. Groove or line spacing in each pixel determines local colour properties, with non-primary colours generated by a pixel mixing. Average groove or line orientation determines movement or colour effects, and the number of distinct values of average curvature and average spacing may be viewed as defining the pixelgram palette, by analogy with the language of computer graphics.

A different, earlier form of pixellated diffraction grating structure is disclosed in U.S. Pat. No. 5,032,003 to Antes. A further disclosure of a security diffraction grating structure is to be found in international patent publication WO90/07133 (application PCT/AU89/00542).

The present applicant's international patent publication WO93/18419 (application PCT/AU93/00102) discloses how selected visually observable effects in the optically variable image may be generated by arraying the pixels in groups within which the pixels are arranged according to a predetermined rule for the pixellated diffraction grating. Thus, for example, multiple sets of different images, or of the same image but different shading or colour, may be produced at different viewing angles.

U.S. Pat. No. 5,059,776 discloses barcodes in which each or one of the bar zones comprises a diffraction grating, or different gratings. The gratings are simple straight line uniform gratings. Also disclosed are readers with multiple detectors to view diffracted beams at different angles in one plane. The diffraction gratings may be asymmetric relief structures in which there are two diffracting surfaces: such a structure produces a pair of diffracted beams of different intensity.

U.S. Pat. No. 5,101,184 to Antes discloses mirror image blazed diffraction gratings in which the arrangement is asymmetric. This arrangement provides simple switching of brightness ratios at plus or minus angles. It is said that regions of different surface profiles can be arranged so that one group of surface portions form a barcode in front of a "background" formed from the other surface portions.

U.S. Pat. Nos. 4,034,211 and 4,023,010, both assigned to NCR Corporation, are concerned with an optical identification system relying on a line of several different quite discrete and distinct straight line gratings. The latter is concerned with a sequence of varying double diffraction gratings, each characteristic of a code value. There are multiple detectors at different angles and U.S. Pat. No. 4,023,010 in particular has considerable discussion about reader and encoder arrangements.

International patent publication WO92/22039 (PCT/AU92/00252) discloses, inter alia, the application of Pixelgram concepts to a machine-readable optical memory device. The broad concept of this application is to impose a barcode, or decrementing data strips, on a pre-formed background diffraction area by erasing the optical effect of transverse strips of the diffraction area. The application proposes that the diffraction area be either a multi-faceted diffraction grating or a pixellated diffraction grating. The latter has the advantage that it is more practical to reproduce accurate Pixelgram gratings from masters than with the multi-faceted approach. According to the technology of international patent publication WO92/122039, barcode information can be superimposed upon a background which may be assigned a characteristic machine-readable optical signature but which is difficult to inexpensively counterfeit.

U.S. Pat. No. 4,788,116 proposes a colour reproduction process in which the colour is controlled by masking segments of three single colour diffraction gratings.

U.S. Pat. No. 4,211,918 to Nyfeler et al discloses a machine-readable document identification marking which in its simplest form (FIG. 2) entails erasure of selected markings of an ordered linear array of markings formed from, say, four different kinds of diffraction or refraction zones. The base arrangement (illustrated in FIG. 1) provides a signature and the selective erasure provides a characteristic binary identification word. Timing markings are also provided and the detector comprises an array of detectors at the appropriate angles for detecting the "high energy first diffraction order". FIGS. 9 and 10 illustrate a slightly more complex arrangement in which there are two parallel "data tracks" in which the erasures complement each other to provide a parity check. U.S. Pat. No. 4,266,122 to Schmidhauser describes a development of the principles of U.S. Pat. No. 4,211,918 in which the erased segments straddle a pair of adjacent markings. The array of markings, which may be holograms or diffraction gratings of "kinoforms", remains essentially linear. U.S. Pat. No. 4,143,810 to Greenaway discloses successive rows of binary words formed by cancellation of specific diffraction grating markings. In contrast to U.S. Pat. No. 4,211,918 and U.S. Pat. No. 4,266,122, the individual markings are all similar. The coding may also be by zones of erasures in a larger diffraction grating zone.

SUMMARY OF THE INVENTION

It has been appreciated by the present inventor that the proposals contained in international patent publication WO92/22039 are of somewhat limited scope in terms of data storage capacity. The focus in that application was on overcoming growing security difficulties with conventional magnetic stripes, which are now easily and inexpensively counterfeited, barcodes and stored value cards. Thus the emphasis is on generating a secure optical background for conventional machine-scannable data devices such as barcodes and decrementable data zones. It has been appreciated, in accordance with the present invention, that the merging technologies of the above-referenced applications can be further developed to provide a more sophisticated optical data element.

The invention according provides, in one aspect, an optical data element comprising:

a plurality of diffraction zones wherein each zone contains a multiplicity of diffraction gratings, which zones may be illuminated and the resultant one or more diffracted beams detected to provide a signature for the element consisting of a series of discrete signature signals each generated by said plurality of zones and each including portions of relatively different intensities;

wherein at least one of said diffraction zones has a segment thereof modified whereby to discernibly alter at least one of the discrete signature signals of said signature and to thereby form a data segment of the data element.

In a second aspect, the invention provides an optical data element comprising:

a plurality of diffraction zones each containing a multiplicity of diffraction gratings, which zones may be illuminated and the resultant one or more diffracted beams detected to provide a signature for the element consisting of a series of discrete signature signals each generated by said plurality of zones and each including portions of relating different intensities.

The diffraction zones are preferably adjacent strips.

The invention also provides, in a third aspect, a method of optically recording data comprising:

providing an optical data element in the form of a plurality of diffraction zones each containing a multiplicity of diffraction gratings, which zones when they are illuminated and the one or more resultant diffracted beams detected, provide a signature for the element consisting of a series of discrete signals each generated by said plurality of zones and each including portions of relatively different intensities; and modifying successive selected segments of said diffraction zones whereby to discernibly alter selected said discrete signature signals of the signature and to thereby form said segments as data segments in or on said element.

In a fourth aspect, the invention affords a method of optically recording data in or on an optical data element in the form of a plurality of diffraction zones each containing a multiplicity of diffraction gratings, which zones when they are illuminated and the one or more resultant diffracted beams detected, provide a signature for the element consisting of a series of discrete signature signals each generated by said plurality of zones and each including portions of relatively different intensities, the method comprising modifying successive selected segments of said diffraction zones whereby to discernibly alter selected said discrete signature signals of the signature and to thereby form said segments as data segments in or on the data element.

In some prior references, the term "relief structure" is utilised interchangeably with or instead of "diffraction grating". In general, moreover, in this specification, the term "grating" is not limited to line or groove gratings but also embraces other diffraction surface structures. The term is also employed herein to indicate a structure which is either reflective or transmissive. Without in any way limiting the scope of "diffraction surface structures", it is noted that such structures may include, for example, small squares, rectangles or polygons.

Preferably, the diffraction zones comprise longitudinally extending substantially parallel zones defining segments including said modified segment(s) which are aligned transversely to said zones to define successive data bands which on illumination generate respective said signature signals. Alternatively, the diffraction zones comprise longitudinally extending substantive parallel zones defining the elongate regions of uniform diffraction grating structure which are aligned transversely to said zones and which on illumination generate respective said signature signals, and wherein said segment(s) comprise finite sub-portions of these regions located so as to define successive data bands which on illumination generate said altered signature signals.

The diffraction gratings of the respective zones are advantageously selected from a set of grating functions which differ in relation to the divergence angle of diffracted beams generated by the grating and/or the angular direction of a diffracted beam of given order for a given wavelength of incident light.

The diffraction gratings of each pixel may, for example, be straight line or curvilinear diffraction gratings.

The multiplicity of diffraction gratings within each diffraction zone preferably comprise diffraction grating pixels of uniform size. The diffraction grating pixels of a respective zone may either be similar throughout the zone, or may be arranged in a multiplicity of similar groups in each of which the pixels are in turn arranged according to a predetermined rule for the zone. In one embodiment of such an arrangement, the zone may be a multi-channel zone wherein each channel contributes a different signal to the element signature.

Each modified data segment of the diffraction zone(s) preferably contains a plurality of diffraction grating pixels of the zone. Advantageously, diffraction grating pixels of all zones of a given optical data element are of a similar shape and dimension, and the modified segments each comprise an area which is an integral multiple of a specific minimum number of such pixels.

Preferably, each data segment comprises a portion of the respective diffraction zone in which the diffractive effect of the portion has been erased or substantially modified.

Preferably, where the diffraction zones are adjacent side-by-side strips, the signature signals for successive transverse bands longitudinally of the strips provide a carrier packet of n pulse components which, by virtue of discernible alterations, e.g. absence of one or more pulse components, may be read as a characteristic n-bit byte of data.

The optical data element preferably includes optical registration means, e.g. an optical sprocket at one or more edges of diffraction zones.

The invention still further provides, in a fifth aspect, a method of reading an optical data element, for example an optical data element according to the first or second aspect of the invention or an optical data element produced by a method according to the third or fourth aspect of the invention, comprising:

moving the optical data element with respect to a detector in one direction while relatively scanning an illuminating light source across the element in another direction;

utilising said detector to record the intensity and/or angular location of diffracted beams successively generated by the diffraction zones during said movement and scanning, whereby to detect a succession of sets of discrete signals; and comparing said sets with a predetermined signature for the element whereby to determine data represented by the sets of discrete signals.

In a sixth aspect, the invention still further provides apparatus for reading an optical data element, for example an optical data element, according to the first or second aspect of the invention, or an optical data element produced by a method according to the third or fourth aspect of the invention, comprising:

detector means;

a light source;

means to move the optical data element with respect to the detector means in one direction while relatively scanning illumination of the light source across the element in another direction;

wherein said detector is adapted to record the intensity and/or angular location of diffracted beams successively generated by the diffraction zones during said movement and scanning, whereby to detect a succession of sets of discrete signals; and means to compare said sets with a predetermined signature for the element, whereby to determine data represented by the sets of discrete signals.

References herein to moving and scanning steps or means embrace relative moving or scanning, in which either or both of the respective integers actually moves or scans.

The optical data element may be a security device in which the aforesaid signature characterises the validity of the device and the data segments are employed to store individual information concerning the holder or user of the device. The optical data element may be affixed to a carrier e.g. a currency note, credit card, bank account or ATM card, debit card, security card, charge card or prepaid card.

BRIEF DESCRIPTION OF THE DRAWINGS

The invention will now be further described, by way of example only, with reference to the accompanying drawings, in which.

DESCRIPTION OF PREFERRED EMBODIMENTS

Figure 1:
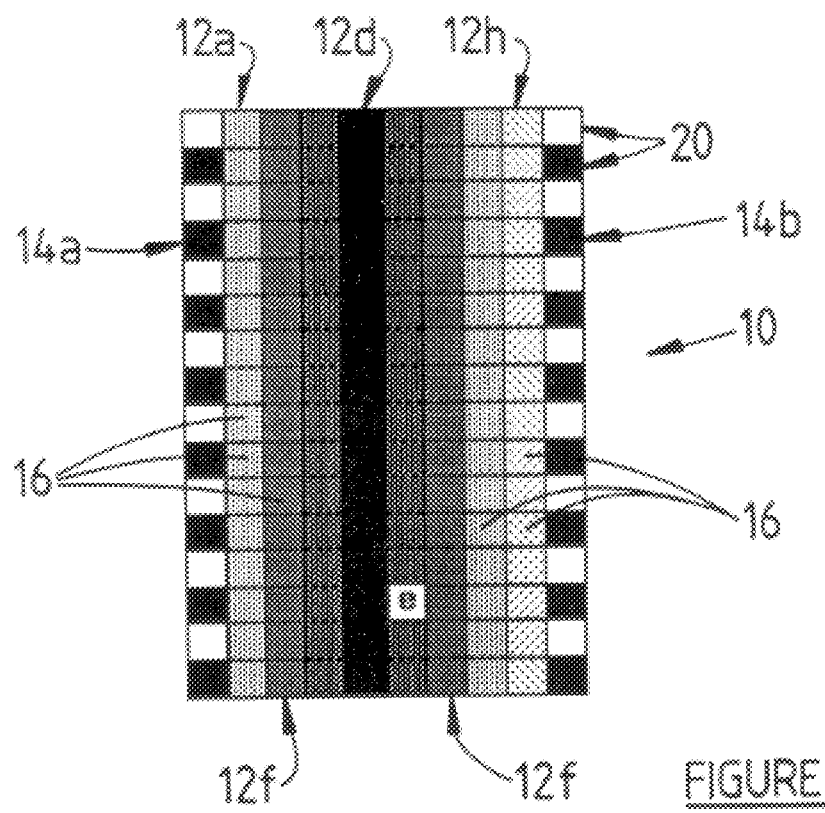
FIG. 1 is a diagram of a simple optical data element according to an embodiment of the invention, which has an 8 component pulse signature and may therefore be employed to provide 8-bit bytes of digital data.

FIG. 1 is an enlarged diagrammatic view of part of an optical data element 10 according to an embodiment of the invention. The element has eight longitudinally extending diffraction zones 12a–12h arranged side-by-side and bounded at the longitudinal edges of the strip by respective optical sprockets 14a,14b. The diffraction zones and sprockets are notionally divided into respective square data segments 16 and each segment 16 of the diffraction zones comprises an n×n square array of diffraction grating pixels. Segments 16 lie in notional transverse data bands 20.

The diffraction grating pixels are uniform within each of the diffraction zones 12a–12h, and the pixels of all of the zones are of uniform square dimensions, preferably small enough to be unresolvable by healthy human eyes, for example at most 125 micron side, and preferably about 60 micron side. In the example of FIG. 1, each data segment is 1 mm square, zones 12 and bands 20 are therefore 1 mm wide, and there are 16×16 pixels per segment. The pixels are thus 62.5 micron square. The preferred minimum dimension of the pixels is the lowest for which diffraction effects between the pixels remain at an acceptable level.

The optical sprockets 14a,14b comprise pairs of red and blue squares or wedges. Byte density and registration is set by the laser scanning duration across the red and blue squares or wedges. The sprockets also ensure correct longitudinal alignment.

Figure 2:
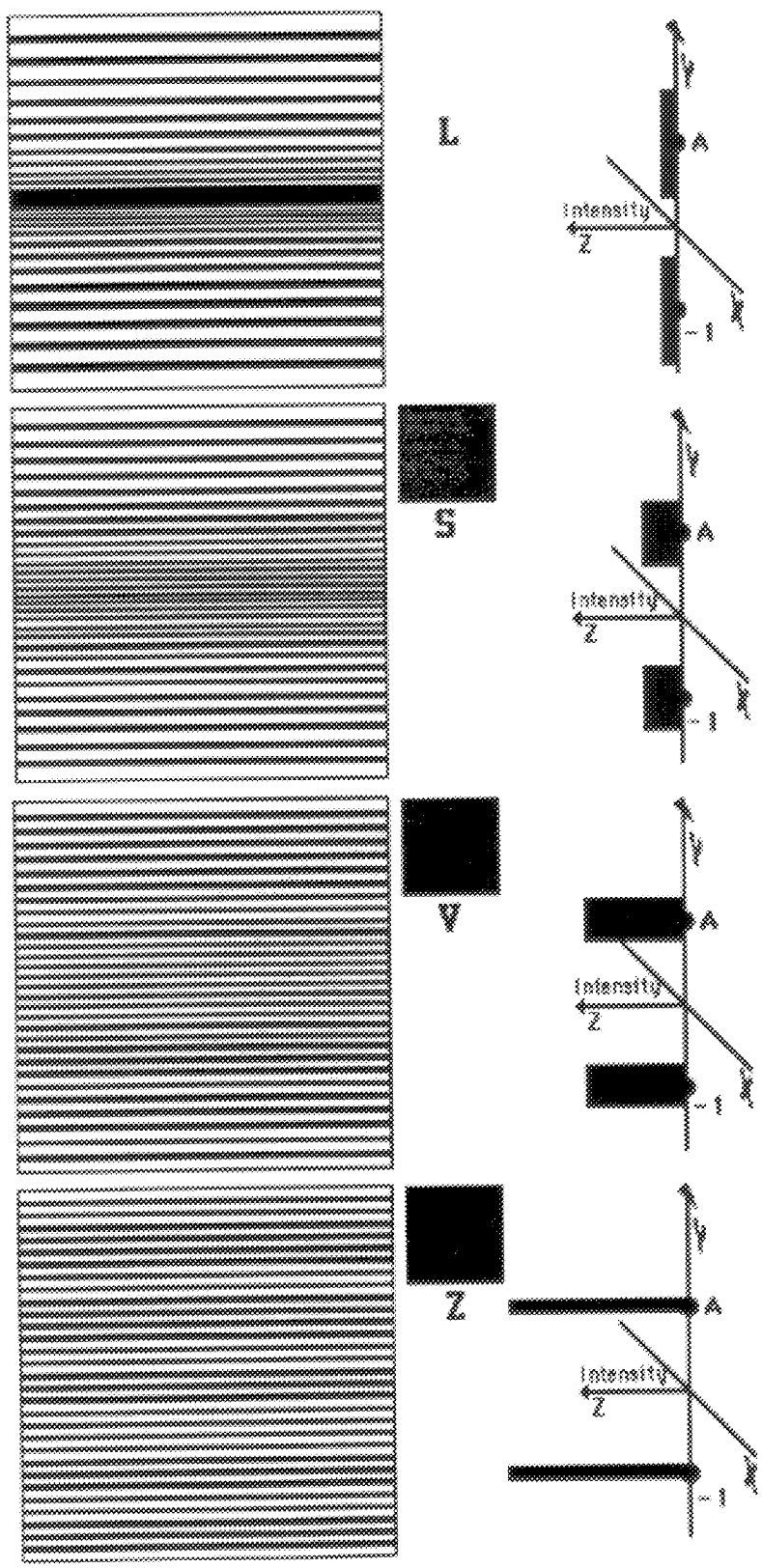
FIG. 2 is an example of four different diffraction grating functions for the optical data element shown in FIG. 1, together with corresponding greyscale values and a matching diagrammatic representation of the relative intensities of the diffracted zero order beam at a given detector location.

The diffraction grating pixels for the respective diffraction zones are chosen from a palette of pixel grating functions. A simple palette comprises a range of straight line grating functions having varying greyscale values, say 16 different functions and corresponding greyscale values. Four such grating pixels 18 are depicted, at a substantial magnification, in FIG. 2. These comprise palette elements L, S, V and Z from a 16 element palette K to Z uniformly varying in steps from near white to substantially black. Each of these grating pixels, when illuminated, will generate a first order diffracted beam whose divergence angle increases from palette element Z to palette element K. Indeed, palette element Z will produce an almost pencil beam. If a detector is placed at a given distance in front of the grating to detect this first order beam, the intensity recorded at the detector will likewise decrease in a stepped scale from palette element Z to palette element K. Thus, if a detector scans across the optical data element 10, it will produce a signature for the element consisting of a series of discrete intensity pulse signature signals each generated by the set of zones 12a to 12h, according to the palette element characteristic of that zone. A typical signature signal is illustrated at A in FIG. 3 and it will be readily appreciated that it can be viewed as an 8-bit byte of digital data, binary value arbitrarily set, e.g. at 0. Each signature signal will typically include portions of relatively different intensities.

Figure 3A:
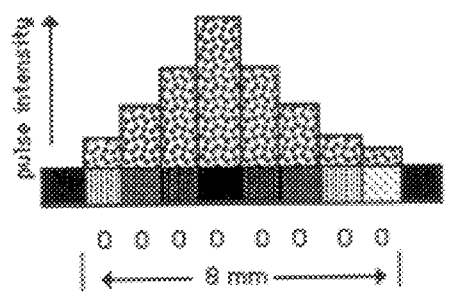
FIG. 3A–3B are diagrammatic representation of recorded pulse intensity for a transverse scan of the optical data element shown in FIG. 1, showing both the basic signature of the element and the altered signal arising from erasure of the data segment "e" indicated in FIG. 1.
Figure 3B:
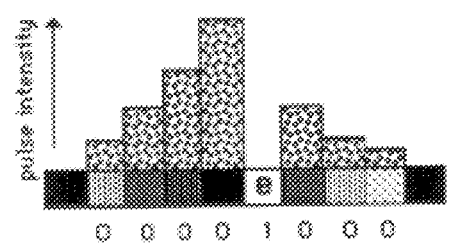
Figure 4:
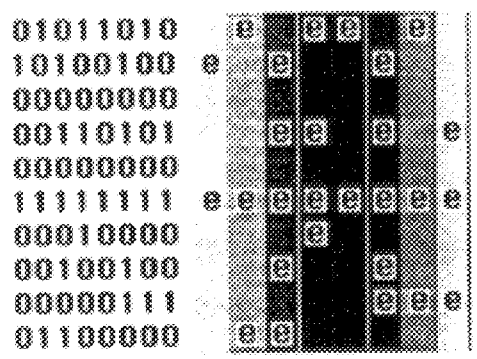
FIG. 4 shows, by multiple examples, how the optical data element of FIG. 1 serves as an 8-bit byte digital storage device.

If one of the data segments 16, specifically the data segment indicated at "e" in FIG. 1, is modified by erasing the diffraction effect of the segment, and the band 20a of data segments 16 containing segment "e" is scanned, the detector output will be as at B in FIG. 3: one pulse is erased and a different binary number is read. It will then be appreciated that by selectively erasing data segments 16 of each successive band 20 of the optical data element, the optical data element can store a succession of 8-bit bytes. FIG. 4 shows a short sequence of bands so encoded, with the binary numbers represented by the altered pulse signatures of pulse packets indicated at left.

"Erasure" of data segments 16 may involve any suitable technique of substantially altering the diffractive effect of the segment so that the detected signal of the diffracted beam from the segment is discernibly altered or eliminated. Such techniques may include erasing the segment by laser ablation, mechanical scratching or micro hot stamping the foil in the segment to remove its diffractive properties.

It will now be appreciated that the optical data element of FIG. 1 may be used as a validating security device in which the 8-bit pulse signature is made characteristic of the element and the digital data then coded onto this pulse. Unlike other prior pulse coding techniques, the signature pulse packet is produced from an array of diffraction zones incorporating pixellated diffraction gratings.

Other palettes utilising different pixel grating functions may be employed in addition to or in place of the straight-line greyscale-based palette thus far discussed. For example, spatial frequency pulse modulation and/or curved line palettes may be employed instead of greyscale amplitude modulation. By this method, an illuminating laser beam will generate diffracted beams at different diffraction angles in either or both of the planes normal to the grating surface, and parallel to or normal to the grating lines.

Figure 5:
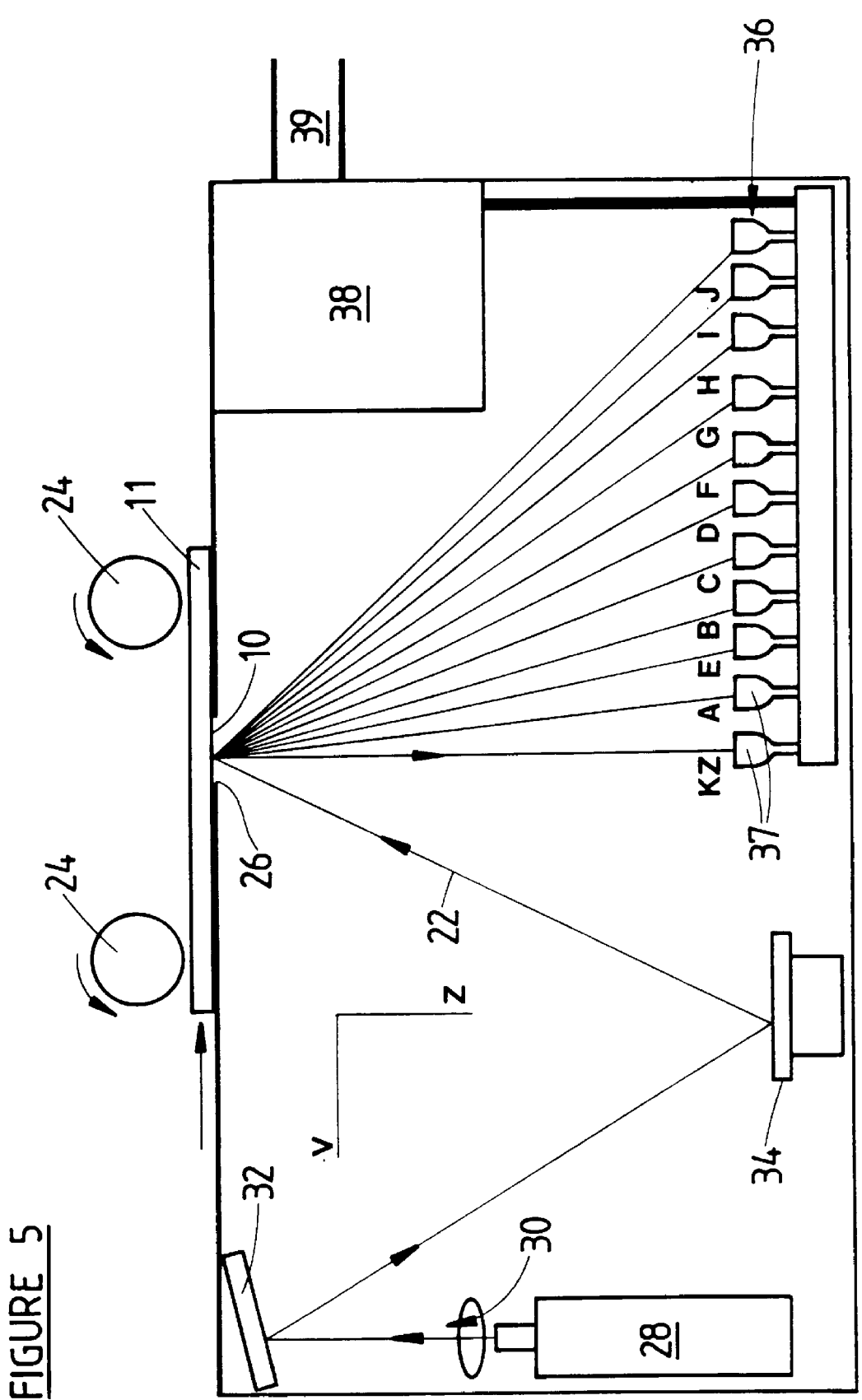
FIG. 5 is a diagrammatic representation of a reader configuration for use with an optical data element of the kind shown in FIG. 1.

FIG. 5 is a representation of a reader configuration for use with optical data elements such as that shown in FIG. 1. The element 10, for example on a credit card 11, is read by a laser beam 22 scanning across the element (that is parallel to bands 20) as the card is moved in the longitudinal direction of the element (i.e. parallel to the longitudinal direction of diffraction zones 12a–12h) by motor driven rollers 24 past a scanning slit 26. Laser beam 22 is derived from a laser 28 via focussing/collimating optics 30, a fixed mirror 32 and a motor driven rocking mirror 34. Rollers 24 are synchronised with rocking mirror 34, which is also connected to a detector array 36. The detectors of array 36 may be individual photomultiplier detectors 37 or successive elements of a charge-coupled diode (CCD) array.

Of the detector array 36, a detector KZ directly in front of scanning slit 26 receives the first order diffracted beams and thus detects the greyscale pixel palette pulses as already described. In a sense, it may be said that detector KZ receives amplitude modulated diffracted beams. Detectors A and E serve as longitudinal registration and byte sequencing detectors, respectively responding to the orientation and elemental structures of optical sprockets 14a,14b. The detectors B to J are not required for the simple optical data element of FIG. 1 but are necessary to detect the angularly varying diffracted beams arising where the grating pixels are constructed from a spatial frequency based palette of grating functions.

Detector array 36 typically feeds pulses to logic circuits 38 which control the registration and reading process, compare the detected pulse packets for the successive bands 20 with a signature pulse packet, whereby to validate the data elements being read and decode the digital information of the element. The decoded digital information is stored prior to sending the information via bus 39 to associated validation equipment. Alternatively, circuits 38 may simply transfer the pulse packets for processing elsewhere.

It will now be well appreciated that the present invention can be viewed as a form of data encoding and decoding by optical pulse sampling. A simple application of the reader depicted in FIG. 5 would be as a validation device in an automatic teller machine for reading optical data elements according to the invention affixed as strips to credit or other cards intended to activate the machine.

It is now proposed to outline one method of practically encoding optical data elements of the kind shown in FIG. 1 as security device for individual credit cards. Very long strips are first produced on which the longitudinal diffraction zones are formed so as to provide a pulse packet signature characteristic of the provider. These strips may be produced, e.g., by the technique described in the present applicant's prior international patent publication WO91/03747. This technique entails programming an electron beam lithography system, utilising selections from a predetermined palette of pixel grating functions. The grating may be typically written as an array of square cut reflective grooves in a metallised surface, for example PMMA electron resist spin coated onto a chrome coated glass substrate. This substrate may then be processed to produce a gold coated nickel master from which a plastic film strip is pressed. A durable metal master of the optimised grating may be obtained by vacuum coating the photo-resist master with 2000 angstrom 99.99% gold and electro-depositing a thick layer of nickel to act as a support. After separating from the glass master, this gold coated nickel master may be bonded to a brass block and used as a dye for hot pressing of plastic film/foil replica gratings.

Figure 6:
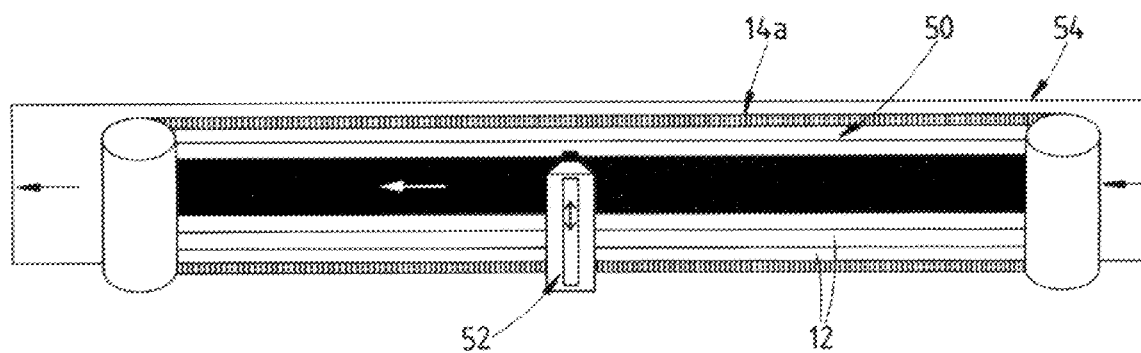
FIG. 6 is a representation of one aspect of data recording arrangement.

With reference to FIG. 6, individual customer data may then be recorded onto the strip 50 by means of a micro hot-stamping process. Successive data segments 16 on the foil strip may be erased by using a micro hot-stamping head 52 to stamp patches of foil onto a plastic or paper master tape 54 which thereby becomes a record of the recorded strips. After a continuous roll of foil is encoded with data in this way it may be cut into individual strips, e.g. 90 mm long, and hot-stamped onto individual credit cards in the usual manner. The same general process may also be used to write large area Pixelgram arrangements onto paper using micro hot-stamping printing.

Figure 7:
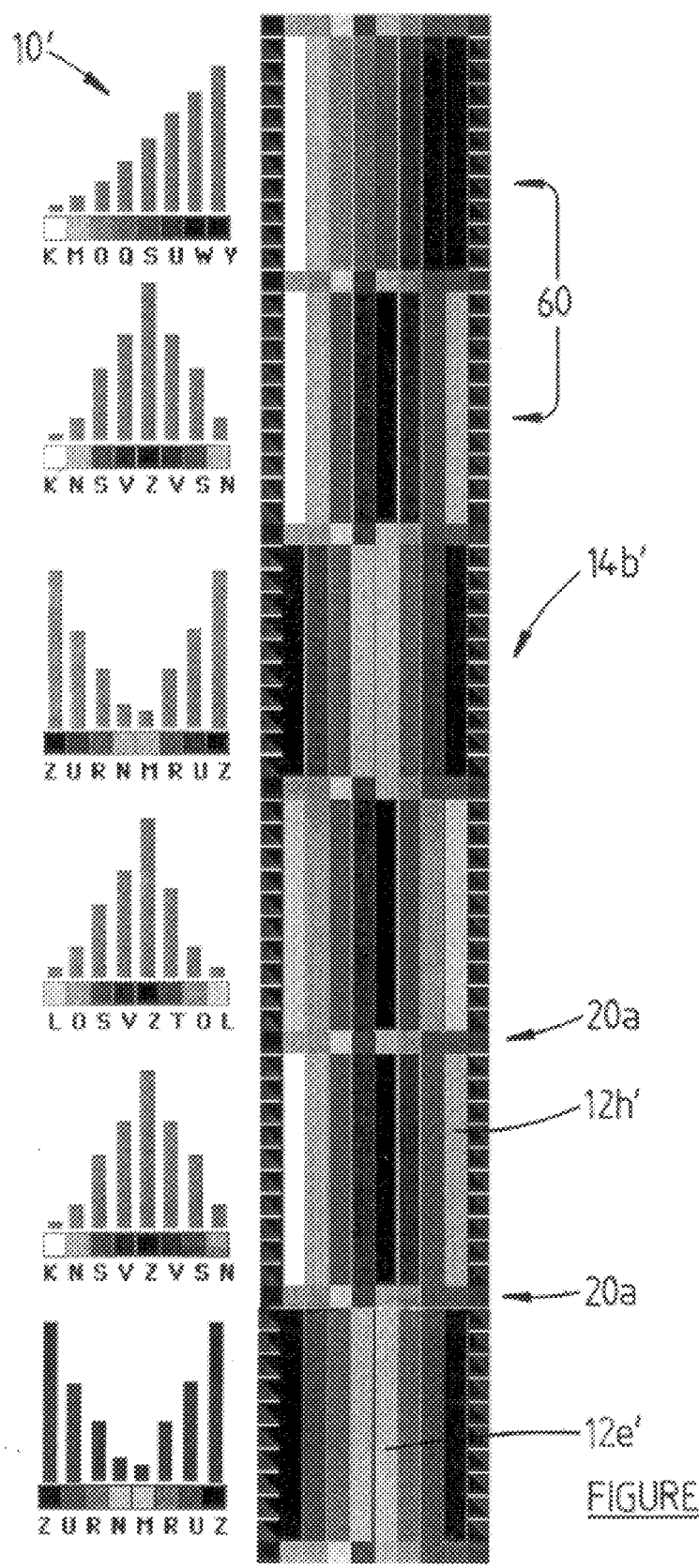
FIG. 7 depicts a more complex highly secure optical data strip according to another embodiment of the invention, the strip containing a sequence of successive regions each containing a distinctive pulse signature represented at left.
Figure 8:
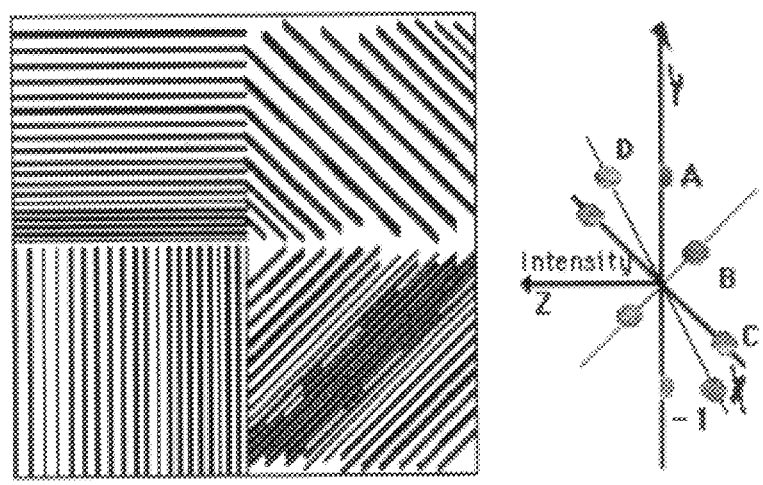
FIG. 8 diagrammatically depicts a four-channel pixel structure which can be used in each of the diffraction zone strips of the optical data elements of FIGS. 1 and 6.

A more complex form of optical data element 10' is depicted in FIG. 7. This structure is suitable for highly secure data encoding and read-out. It will be seen that the element is divided longitudinally into successive regions 60 for each of which a different signature pulse packet is defined by a different selection of diffraction grating pixel functions from the pixel function palette. The successive regions 60 are separated by transverse bands 20a forming registration and bit sequencing switches for the recording of digital data. These switches 20a are also used for bit verification during the reading process. In this case, the aforementioned spatial frequency based palette is employed for switches 20a, and the different shades in the bands 20a of FIG. 7 correspond to different diffraction angles in either the XZ or YZ planes (the XY plane being the plane of the element).

It will be appreciated that the invention, in its preferred application provides a novel optical memory and data encoding technology that uses a unique multiply degenerate digital encoding and readout system to produce a substantially error-free signal as well as automatic authentication of each pulse packet. Authenticity can be assured by the unique pulse packet shapes and beam spreading characteristics that the grating pixel palette functions can generate. Applications of the technology include machine-authentication of documents, stored value memory systems, and a replacement technology for the magnetic stripe technology now used on credit cards. The components of the reader may be simple and inexpensive, no special custom chips being required. A suitable encoding configuration in accordance with the invention can be adapted from existing Pixelgram and encoding technologies.

I claim:

1. An optical data element comprising:
   a plurality of diffraction zones wherein each zone contains a multiplicity of diffraction gratings, which zones may be illuminated and the resultant one or more diffracted beams detected to provide a signature for the element consisting of a series of discrete signature signals each generated by said plurality of zones and each including portions of relatively different intensities;

wherein at least one of said diffraction zones has a segment thereof modified whereby to discernibly alter at least one of the discrete signature signals of said signature and to thereby form a data segment of the data element.

2. An optical data element according to claim 1, wherein said diffraction zones comprise longitudinally extending substantially parallel zones defining segments including said modified segment(s) which are aligned transversely to said zones to define successive data bands which on illumination generate respective said signature signals.

3. An optical data element according to claim 1, wherein said diffraction zones comprise longitudinally extending substantially parallel zones defining elongate regions of uniform diffracting grating structure which are aligned transversely to said zones and which on illumination generate respective said signature signals, and wherein said segment (s) comprise finite sub-portions of these regions located so as to define successive data bands which on illumination generate said altered signature signals.

4. An optical data element according to claim 2, wherein each of said segments comprises an array of multiple diffraction gratings.

5. An optical data element according to claim 1, wherein said segment(s) are substantially square segments.

6. An optical data element according to claim 1, wherein said diffraction gratings are selected from a set of grating functions which differ in relation to the divergence angle of diffracted beams generated by the grating and/or the angular direction of a diffracted beam of given order for a given wavelength of incident light.

7. An optical data element according to claim 1, wherein said diffraction gratings are straight line diffraction gratings.

8. An optical data element according to claim 1, wherein said diffraction gratings are curvilinear diffraction gratings.

9. An optical data element according to claim 1, wherein said diffraction gratings are substantially square pixels of a dimension small enough to be unresolvable by healthy human eyes.

10. An optical data element according to claim 1, wherein said diffraction gratings are substantially square pixels of side dimension less than about 125 micron.

11. An optical data element according to claim 1, wherein the multiplicity of diffraction gratings within each diffraction zone comprise diffraction grating pixels of uniform size.

12. An optical data element according to claim 11, wherein the diffraction gratings of a respective said zone are similar throughout the zone.

13. An optical data element according to claim 11, wherein the diffraction grating pixels are arranged in a multiplicity of similar groups in each of which the pixels are in turn arranged according to a predetermined rule for the zone.

14. An optical data element according to claim 13, wherein said zone with a predetermined rule is a multichannel zone wherein each channel contributes a different signal to the element signature.

15. An optical data element according to claim 11, wherein diffraction grating pixels of all zones of a given optical data element are of a similar shape and dimension, and the modified segments each comprise an area which is an integral multiple of a specific minimum number of such pixels.

16. An optical data element according to claim 1, wherein each modified data segment of the diffraction zone(s) preferably contains a plurality of diffraction grating pixels of the zone.

17. An optical data element according to claim 1, wherein said data segment comprises a portion of the respective diffraction zone in which the diffractive effect of the portion has been erased or substantially modified.

18. An optical data element according to claim 1, wherein said diffraction zones are adjacent side-by-side strips, the signature signals for successive transverse bands longitudinally of the strips providing a carrier packet of n pulse components which, by virtue of discernible alterations, e.g. absence of one or more pulse components, may be read as a characteristic n-bit byte of data.

19. An optical data element according to claim 1, wherein said optical data element includes optical registration means, e.g. an optical sprocket at one or more edges of diffraction zones.

20. An optical data element according to claim 1, wherein the optical data element is a security device in which the aforesaid signature characterises the validity of the device and the data segments are employed to store individual information concerning the holder or user of the device.

21. An optical data element comprising:

a plurality of diffraction zones each containing a multiplicity of diffraction gratings, which zones may be illuminated and the resultant one or more diffracted beams detected to provide a signature for the element consisting of a series of discrete signature signals each generated by said plurality of zones and each including portions of relatively different intensities.

22. An optical data element according to claim 21, wherein said diffraction zones comprise longitudinally extending substantially parallel zones defining segments which are aligned transversely to said zones to define successive data bands which on illumination generate respective said signature signals.

23. An optical data element according to claim 21, wherein said diffraction gratings are selected from a set of grating functions which differ in relation to the divergence angle of diffracted beams generated by the grating and/or the angular direction of a diffracted beam of given order for a given wavelength of incident light.

24. An optical data element according to claim 21, wherein said diffraction gratings are straight line diffraction gratings.

25. An optical data element according to claim 21, wherein said diffraction gratings are curvilinear diffraction gratings.

26. An optical data element according to claim 21, wherein said diffraction gratings are substantially square pixels of a dimension small enough to be unresolvable by healthy human eyes.

27. An optical data element according to claim 21, wherein said diffraction gratings are substantially square pixels of side dimension less than about 125 micron.

28. An optical data element according to claim 21, wherein the multiplicity of diffraction gratings within each diffraction zone comprise diffraction grating pixels of uniform size.

29. An optical data element according to claim 28, wherein the diffraction gratings of a respective said zone are similar throughout the zone.

30. An optical data element according to claim 28, wherein the diffraction grating pixels are arranged in a multiplicity of similar groups in each of which the pixels are in turn arranged according to a predetermined rule for the zone.

31. An optical data element according to claim 30, wherein said zone with a predetermined rule is a multi-channel zone wherein each channel contributes a different signal to the element signature.

32. An optical data element according to claim 21, wherein said diffraction zones are adjacent side-by-side strips, the signature signals for successive transverse bands longitudinally of the strips providing a carrier packet of n pulse components which, by virtue of discernible alterations, e.g. absence of one or more pulse components, may be read as a characteristic n-bit byte of data.

33. An optical data element according to claim 21, wherein said optical data element includes optical registration means, e.g. an optical sprocket at one or more edges of diffraction zones.

34. An optical data element according to claim 21, wherein said optical data element is affixed to a currency note, credit card, bank account or ATM card, debit card, security card, charge card or prepaid card.

35. A method of optically recording data comprising:
providing an optical data element in the form of a plurality of diffraction zones wherein each zone contains a multiplicity of diffraction gratings, which zones when they are illuminated and the one or more resultant diffracted beams detected, provide a signature for the element consisting of a series of discrete signature signals each generated by said plurality of zones and each including portions of relatively different intensities; and modifying successive selected segments of said diffraction zones whereby to discernibly alter selected said discrete signature signals of said signature and to thereby form said segments as data segments in or on said element.

36. A method according to claim 35, wherein said selected segments are modified by erasing or substantially modifying the diffractive effect of the respective segments.

37. A method of optically recording data in or on an optical data element in the form of a plurality of diffraction zones each containing a multiplicity of diffraction gratings, which zones when they are illuminated and the one or more resultant diffracted beams detected, provide a signature for the element consisting of a series of discrete signature signals each generated by said plurality of zones and each including portions of relatively different intensities, the method comprising modifying successive selected segments of said diffraction zones whereby to discernibly alter selected said discrete signature signals and to thereby form said segments as data segments in or on the data element.

38. A method according to claim 37, wherein said selected segments are modified by erasing or substantially modifying the diffractive effect of the respective segments.

* * * * *